United States Patent [19]
Willey

[11] Patent Number: 4,768,733
[45] Date of Patent: Sep. 6, 1988

[54] SEAT BELT RETRACTOR

[75] Inventor: Ronald A. Willey, Port Huron, Mich.

[73] Assignee: TRW Vehicle Safety Systems Inc., Lyndhurst, Ohio

[21] Appl. No.: 933,385

[22] Filed: Nov. 21, 1986

[51] Int. Cl.$^4$ ............................................. B65H 75/48
[52] U.S. Cl. ................................................ 242/107.4 B
[58] Field of Search ............ 242/107, 107.3, 107.4 R, 242/107.4 B, 107.6, 107.4 A, 107.7; 280/806–808, 801–808; 297/474–480 C

[56] References Cited

U.S. PATENT DOCUMENTS

| | | | |
|---|---|---|---|
| 2,953,315 | 9/1960 | Lautier et al. | 242/107.4 |
| 3,206,137 | 9/1965 | Snyderman | 242/107.4 R |
| 3,482,799 | 12/1969 | Wrighton et al. | 242/107.4 |
| 3,510,085 | 5/1970 | Stoffel | 242/107.4 R |
| 3,604,655 | 9/1971 | Jones | 242/107.4 R |
| 3,841,581 | 10/1974 | Salamon | 242/107.4 |
| 3,897,913 | 8/1975 | Hall | 242/107.4 A |
| 3,910,525 | 10/1975 | Takada | 242/107.4 |
| 3,915,400 | 10/1975 | Takada | 242/107.4 |
| 4,293,105 | 10/1981 | Weman | 242/107.4 B |
| 4,427,164 | 1/1984 | Rumpf | 242/107.4 R |
| 4,566,649 | 1/1986 | Petersen | 242/107.4 A |
| 4,573,646 | 3/1986 | Willey | 242/107.4 A |
| 4,691,875 | 9/1987 | Higbee | 242/107.4 B |

FOREIGN PATENT DOCUMENTS 860980 2/1961 United Kingdom .

Primary Examiner—David Werner
Attorney, Agent, or Firm—Tarolli, Sundheim & Covell

[57] ABSTRACT

A seat belt retractor includes a seat belt spool supported by a frame for rotation about an axis in belt withdrawal and belt retraction directions. A ratchet wheel is connected to and rotatable with the spool. A pawl is pivotable between a release position in which it does not engage the ratchet wheel to allow rotation of the spool in the belt withdrawal direction and a lock position in which it engages the ratchet wheel to prevent rotation of the spool in the belt withdrawal direction. The pawl pivots from the release position towards the lock position in response to rotation of the spool in the belt withdrawal direction at a rate of acceleration above a predetermined rate. A spring is coupled to the frame and the pawl to pivot the pawl to the lock position after the pawl pivots beyond a predetermined position defined by a line interconnecting the pivot point of the pawl and the point at which the spring is connected to the frame.

2 Claims, 2 Drawing Sheets

SEAT BELT RETRACTOR

CROSS REFERENCE TO RELATED APPLICATIONS

Reference is hereby made to the following co-pending applications dealing with related subject matter and assigned to the assignee of the present invention:

1. "Seat Belt Retractor" by W. C. Higbee, U.S. Ser. No. 589,679 and filed Mar. 15, 1984.
2. "Planetary Inertial Seat Belt Retractor" by W. C. Higbee, U.S. Ser. No. 797,593 and filed Nov. 13, 1985 now U.S. Pat. No. 4,691,875.

BACKGROUND OF THE INVENTION

1. Field of the Invention

The present invention relates to a seat belt retractor and, more particularly, to a web sensitive seat belt retractor.

2. Description of the Prior Art

Web sensitive seat belt retractors are known. Such retractors lock to prevent seat belt withdrawal in response to withdrawal of the seat belt at a rate of acceleration above a predetermined rate. The retractor locks upon rapid belt acceleration in a withdrawal direction caused by, for example, movement of an occupant relative to a vehicle undergoing a high rate of deceleration.

A web sensitive locking retractor includes a spool on which seat belt webbing is wound. The spool rotates to permit withdrawal and retraction of the belt webbing. A ratchet is fixed to the spool and rotates with the spool. A pivotable pawl engages the ratchet to block rotation of the spool in a belt withdrawal direction. Typically, the web sensitive retractor also includes an inertia member which cannot follow acceleration of the spool undergoing rapid withdrawal of the belt, and lags behind spool rotation. Thus, the inertia member and spool rotate relative to each other. This relative rotation is used to actuate pivoting of the pawl to lock the retractor.

Web sensitive seat belt retractors generally tend to be relatively complex in structure. Thus, there remains a continuing need for improvements in the design of web sensitive seat belt retractors.

SUMMARY OF THE INVENTION

The present invention is a novel and improved web sensitive seat belt retractor. The retractor includes a frame supporting a spool for rotation in belt withdrawal and belt retraction directions. A pawl pivots between a release position allowing rotation of the spool in the belt withdrawal direction and a lock position preventing rotation of the spool in the belt withdrawal direction. The pawl pivots from the release position towards the lock position in response to acceleration of the spool in the belt withdrawal direction above a predetermined rate. A spring forces the pawl fully into the lock position after the pawl moves past a predetermined position towards the lock position.

The spring and pawl operate in an overcenter manner. The spring is a leaf spring attached at one end to the retractor frame. A second end of the spring engages the pawl. When the pawl and second end of the spring move toward the lock position past a predetermined position defined by a line interconnecting the axis about which the pawl pivots and the point at which the spring attaches to the frame, the spring moves the pawl further in that direction. Thus, the spring moves the pawl fully into the lock position once the pawl has moved towards the lock position past the predetermined position.

A mechanism which responds to rotational acceleration of the spool in the belt withdrawal direction above a predetermined rate moves the pawl toward the lock position. In the preferred embodiment, the pawl moves toward the lock position in response to relative rotation of an inertia mechanism and the spool. This relative rotation occurs when the spool rotates in the belt withdrawal direction at a rate of acceleration above a predetermined rate. The inertia mechanism has an inertia member with a mass which cannot accelerate above the predetermined rate and thus rotates in a lagging relation to the spool. This lagging rotation of the inertia mechanism is used to pivot the pawl towards the lock position.

BRIEF DESCRIPTION OF THE DRAWINGS

Further features of the present invention will become apparent to those skilled in the art to which the present invention relates from a reading of the following specification made with reference to the accompanying drawings, in which.

DETAILED DESCRIPTION OF THE INVENTION

Figure 1:
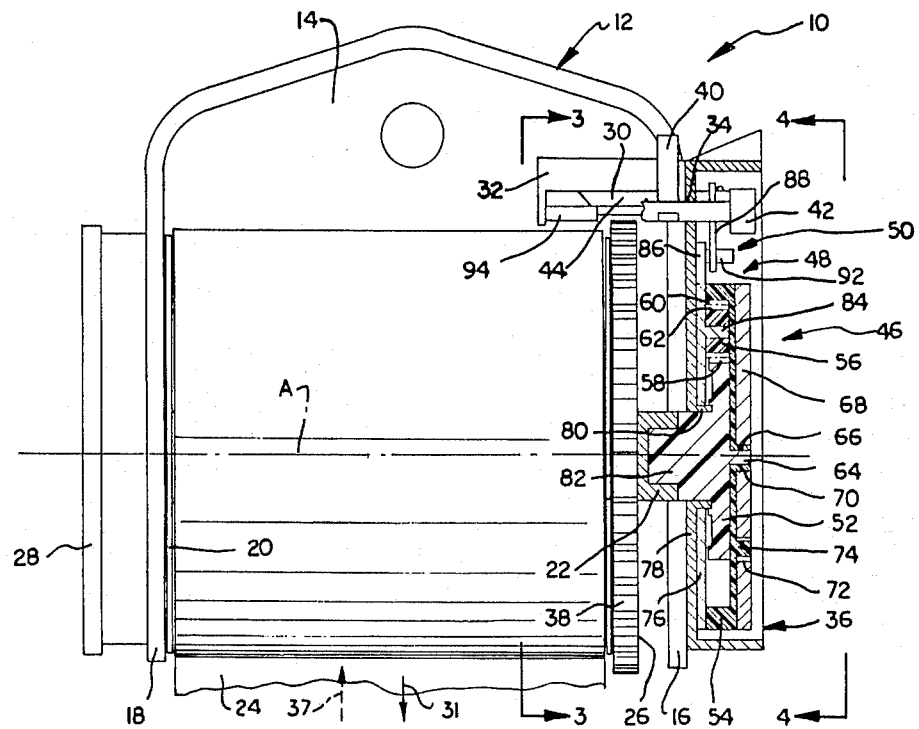
FIG. 1 is a plan view, partially in section, of a web sensitive seat belt retractor embodying the present invention.
Figure 2:
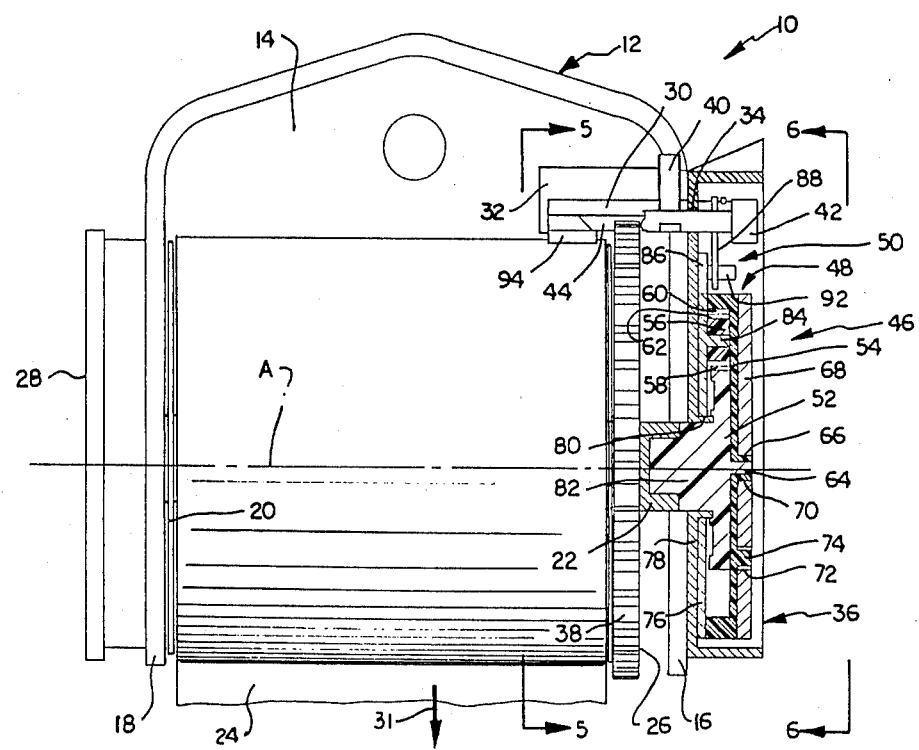
FIG. 2 is a view of the retractor similar to FIG. 1, illustrating parts in a different position.

A web sensitive seat belt retractor 10 is illustrated in FIGS. 1 and 2. The seat belt retractor 10 includes a frame 12. The frame 12 has a base portion 14 and a pair of laterally spaced, generally parallel side portions 16 and 18 formed as one piece with the base portion 14. The retractor 10 also includes a spool 20 located between the side frame portions 16, 18. A shaft 22 is journalled in the side frame portions 16, 18 and supports the spool 20 for rotation about its longitudinal central axis A. A seat belt 24 is attached to the spool 20. Rotation of the spool 20 in a belt retraction direction winds the seat belt 24 onto the spool. Rotation of the spool 20 in a belt withdrawal direction unwinds the seat belt 24 from the spool.

The seat belt retractor 10 includes a toothed ratchet wheel 26 which is fixed to an end portion of the spool 20. The ratchet wheel 26 is disposed adjacent to and inwardly of the frame side portion 16. A spring (not shown) is disposed in a compartment 28 outwardly of the other frame side portion 18. The spring biases the spool 20 in the belt retraction direction and thus tends to wind the seat belt 24 onto the spool 20.

Figure 3:
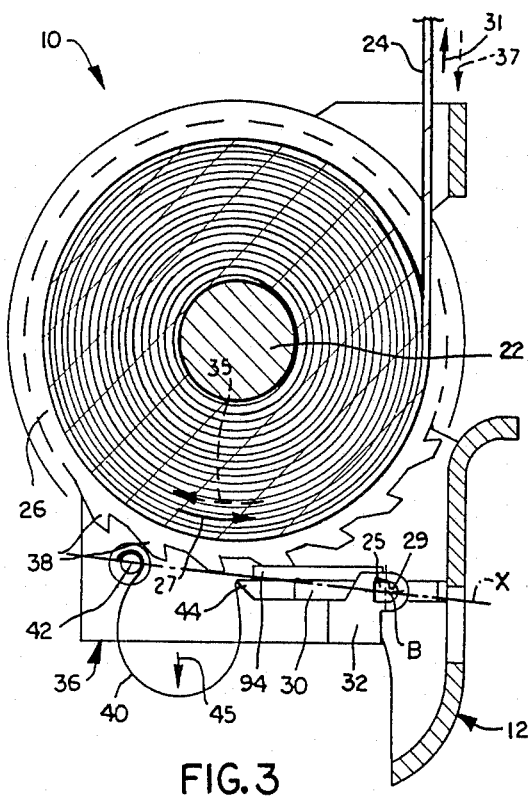
FIG. 3 is a sectional view taken approximately along the line 3—3 of FIG. 1.
Figure 5:
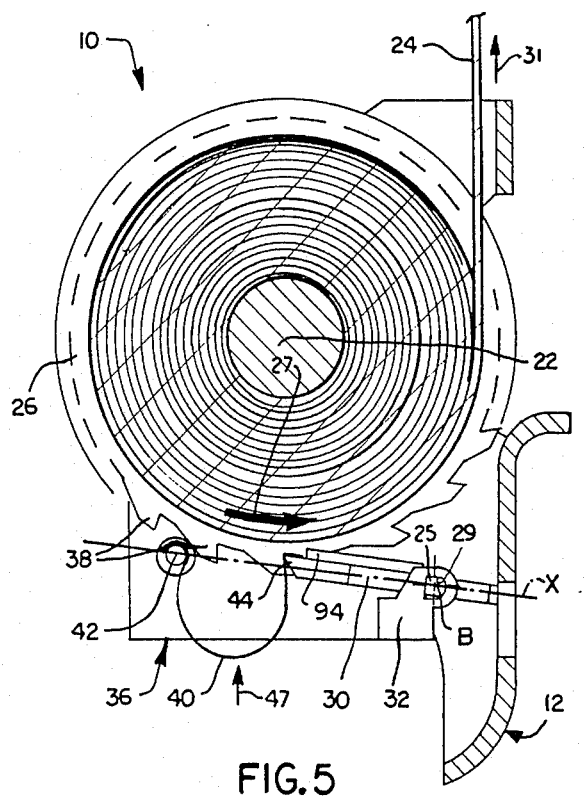
FIG. 5 is a sectional view of the retractor taken approximately along the line 5—5 of FIG. 2.
Figure 4:
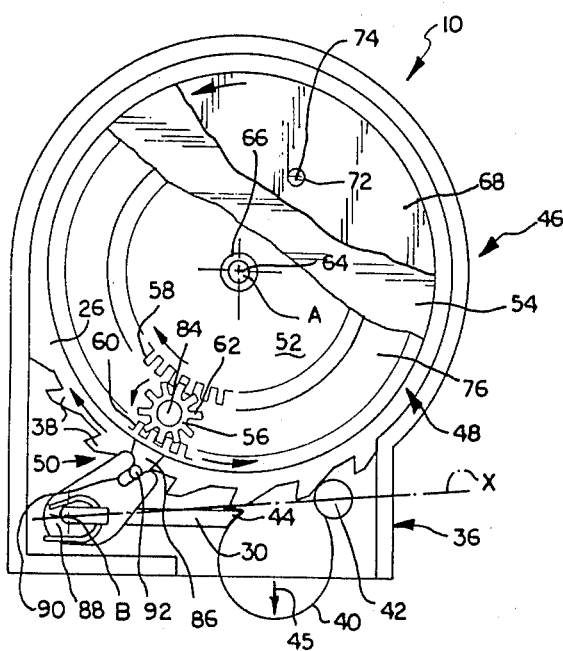
FIG. 4 is a side elevational view, with parts broken away, taken along the line 4—4 of FIG. 1.
Figure 6:
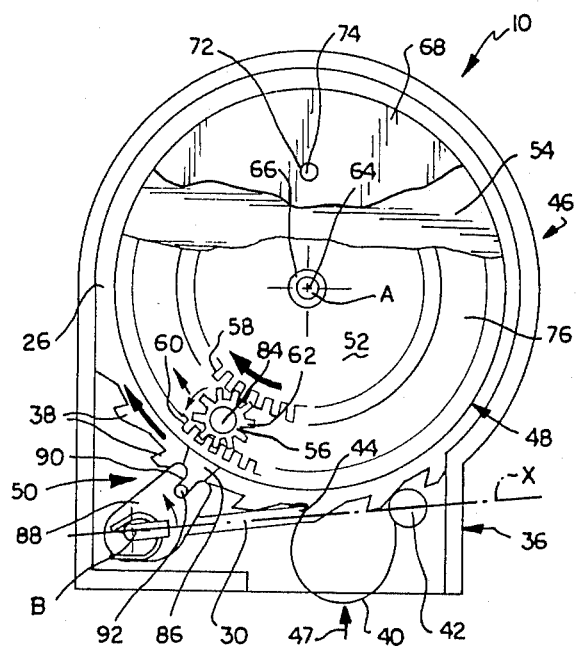
FIG. 6 is a side elevational view, with parts broken away, taken along the line 6—6 of FIG. 2.

The seat belt retractor 10 includes a pawl 30 (FIGS. 1 and 3) for blocking rotation of the spool 20 in the direction indicated by the arrow 27 (FIGS. 2 and 3) when the belt is withdrawn, under predetermined conditions, in the direction indicated by the arrow 31. The pawl 30 is supported for pivotal movement about an axis B in a housing 36 attached to the frame side portion 16. The pawl pivots on stub shafts 25 that lie on the axis B and are journalled in openings 29 in portions 32, 34 of the housing 36. The pawl 30 is disposed adjacent to and extends transversely of the ratchet wheel. The pawl 30 is pivotable between a release position, as illustrated in FIGS. 1, 3 and 4, and a lock position, as illustrated in FIGS. 2, 5 and 6. In the release position, the pawl 30 is disengaged from the peripheral teeth 38 on the ratchet wheel to allow rotation of the spool 20 in the belt withdrawal direction 27. In the lock position, the pawl 30 engages the teeth 38 and blocks rotation of spool 20 in the belt withdrawal direction 27. When the pawl 30 engages the ratchet teeth, the ratchet teeth 38 permit rotation of the spool 20 in the direction indicated by the arrow 35 when the belt 24 is retracted onto the spool in the direction indicated by the arrow 37.

The seat belt retractor 10 includes a U-shaped, steel leaf spring 40 (best seen in FIGS. 3 to 6). The spring 40 is fixed at one end to a pin 42 attached to the housing 36. The other end of the spring 40 engaqes a tapered end tip 44 of the locking pawl 30.

The spring 40 moves between a first position, illustrated in FIGS. 3 and 4, and a second position, illustrated in FIGS. 5 and 6. In the first position, the spring 40 biases the pawl 30 in a release direction away from the ratchet wheel 26, as indicated by the arrow 45 in FIGS. 3 and 4. In the second position, the spring 40 biases the pawl 30 in a lock direction towards the ratchet wheel 26, as indicated by the arrow 47 in FIGS. 5 and 6. The spring 40 moves between the first and second positions upon movement of the end tip 44 of the locking pawl 30 beyond a predetermined position. The predetermined position is defined by a line X interconnecting the axis B and the center of pin 42 to which the spring 40 is connected. Once the pawl tip 44 moves in a given direction from one side of the line X to the other side of the line X, the spring 40 will force the pawl to pivot further in that direction until the pawl is mechanically stopped. The pawl 30 is mechanically stopped from further movement when the pawl tip 44 engages the ratchet wheel 26 or when the stub shaft 25 engages the lower and arcuate surfaces, as viewed in FIGS. 3 and 5, defining the openings 29 in the housing portions 32, 34. When the pawl 30 is in either its release position or its lock position, the spring 40 biases the pawl 30 to maintain it in that position.

The pawl end tip 44 is moved in the lock direction from one side of the line X to the other side of the line X by a mechanism 46. This movement occurs in response to rotation of the spool 20 in the belt withdrawal direction at a rate of acceleration above a predetermined rate. The mechanism 46 (FIGS. 4 and 6) includes a planetary gear system 48 and a connecting mechanism 50 for connecting the planetary gear system 48 to the locking pawl 30. The planetary gear system 48 includes a sun gear 52, a ring gear 54, and a planet gear 56. The sun gear 52 has external circumferential teeth 58. The ring gear 54 has internal circumferential teeth 60. The planet gear 56 has external circumferential teeth 62 intermeshing with the external teeth 58 on the sun gear 52 and the internal teeth 60 on the ring gear 54. The planet gear 56 moves about the central axis A of the shaft 22 and the spool 20 in response to relative rotation of the sun and ring gears 52, 54.

The sun gear 52 is connected to the shaft 22 and thus rotates with the shaft and spool 20. A central stub shaft 64 is formed as one piece with the sun gear 52 and extends therefrom. The stub shaft 64 supports the ring gear 54 for relative rotation. The stub shaft 64 is received in a central hub 66 of the ring gear 54. The sun and ring gears 52, 54 are coaxial and rotate about the axis A.

A circular weighted body 68 is connected to the ring gear 54 adjacent the radially extending exterior side surface of the ring gear. The weighted body 68 has a central opening 70 and a radially displaced smaller opening 72. The central hub 66 projects into the opening 70 and thus supports the weighted body 68. An axially extending pin 74 on the ring gear 54 projects into the radially displaced smaller opening 72 to prevent relative rotation between the ring gear and the weighted body 68. The ring gear 54 and weighted body 68 constitute an inertia mechanism which rotates relative to the spool 20 and sun gear 52. The mass of the inertia mechanism is selected so that the sun gear 52 drives the planet gear 56 which in turn drives the ring gear 54 in unison with the sun gear 52 when the spool 20 rotates in the belt withdrawal direction at a rate of acceleration less than a desired predetermined rate. Such relatively slow acceleration rates are ordinarily experienced when a vehicle occupant withdraws the seat belt 24 to fasten it or moves about during normal operation of the vehicle. When the spool 20 accelerates at a rate exceeding the predetermined rate, the rotation of the inertia mechanism and thus the ring gear 54 will lag behind rotation of the sun gear 52. Such relatively high acceleration is experienced if a sudden withdrawal of the seat belt 24 occurs during an accident or sudden deceleration of the vehicle.

When the inertia mechanism rotates in unison with the spool 20 and sun gear 52, the planet gear 56 does not move about the axis A, as is illustrated in FIG. 4. When the inertia mechanism rotates in lagging relation to the spool 20 and sun gear 52, however, the planet gear 56 will move, or "walk", about the axis A. This causes the planet gear 56 to move a relatively small distance from the position of FIG. 4 to the position of FIG. 6. Such movement or "walking" of the planet gear 56 causes the pawl 30 to move from the release position of FIG. 4 towards the lock position of FIG. 6. Movement of the pawl 30 towards the lock position occurs because the connecting mechanism 50 couples the planet to the pawl 30. Thus, the connecting mechanism transmits the movement of the planet gear 56 about axis A to the pawl 30. When the tip 44 of the pawl 30 moves past the line X towards the lock position, the spring 40 forces the pawl fully into the lock position and into engagement with the ratchet wheel 26. The tip 44 engages the ratchet wheel teeth 38 to prevent withdrawal of the belt 24 by blocking further rotation of the spool 20 in the clockwise direction, as viewed FIG. 6.

The connecting mechanism 50 an annular disk 76 disposed between the sun and ring gears 52, 54, on the one hand, and the housing wall 78, on the other hand, as seen in FIGS. 1 and 2. The disk 76 is rotatably mounted on a central hub 80 formed as one piece with the housing wall 78 shaft portion 82 of the ring gear 52 extends coaxially through the central hub 80 and drivingly connects the shaft 22 with the ring gear. The circular disk 76 is rotatable relative to the hub 80, the spool 20 and the sun and ring gears 52, 54 about the axis A. A pin 84 is fixed to the circular disk 76 at a point located radially outward from the axis A between the sun and ring gear teeth 58, 60. The planet gear 56 is rotatably mounted on the pin 84. An actuating arm 86 is connected to and projects radially outward from the periphery of the disk 76. A pin 92 fixed at the outermost end of the arm 86 projects axially away from the arm. The pin 92 is received in the slotted end portion 90 of a link 88 that is connected to and pivots with the pawl 30.

When the planet gear 56 moves about axis A from the position of FIG. 4 to the position of FIG. 6, the disk 76 rotates clockwise about axis A. The actuating arm 86 pivots the link 88 and locking pawl 30 counterclockwise about its pivot axis B. Once the tip 44 of the pawl 30 moves past the line X, the spring 40 forces the pawl to pivot further in a counterclockwise direction about axis B and into its lock position. The pawl 30 remains in engagement with the ratchet wheel teeth 38 while tension remains on the seat belt 24 due to the force of the occupant's body movement. Once the tension is removed from the seat belt 24, the retraction spring in compartment 28 rotates the spool 20 in the belt retraction direction. However, the pawl 30 is bised by the spring 40 to the lock position, thereby sti1 preventing withdrawal of the seat belt 24.

The seat belt retractor 10 further includes an arm 94 (FIGS. 1, 2, 3 and 4) connected to and pivotable with the locking pawl 30 for sensing the amount of the belt 24 which is wound onto the spool 20. The arm 94 overlies the edge of the belt 24 to engage the belt and moves radially outwardly, as the amount of belt would onto the spool increases. Movement of the arm 94 also pivots the pawl 30 when a predetermined amount of belt 24 rewinds onto the spool 20. The locking poawal 30 is pivoted by the arm 94 clockwise, as viewed in FIG. 4, from the lock position towards the release position. When the tip 44 of the pawl 30 moves back past the predetermined position defined by the line X, the spring 40 forces the pawl 30 to pivot further clockwise, as viewed- in FIG. 6, to the release position.

The sun, ring and planet gears 52, 54, 56 and the disk 76 may be made of metal or plastic. If the ring gear 54 is made of plastic, the weighted body 68 will preferably be made of metal to add mass to the ring gear and thus provide the desired mass.

From the above description of a preferred embodiment of the invention, those skilled in the art will perceive improvements, changes and modifications. Such improvements, changes and modifications within the skill of the art are intended to be covered by the appended claims.

Having described a preferred embodiment, I claim:

1. A seat belt retractor comprising:
    a frame;
    a spool supported by said frame for rotation about an axis;
    seat belt webbing connected to said spool and which unwinds from and rewinds onto said spool upon rotation of said spool in respective belt withdrawal and belt retraction directions;
    a ratchet wheel connected to said spool and rotatable therewith;
    a pawl pivotally movable between a release position in which said pawl is disengaged from said ratchet wheel to permit rotation of said spool and a lock position in which said pawl engages said ratchet wheel to block rotation of said spool in the belt withdrawal direction;
    a spring associated with said pawl and connected to said frame to move said pawl to one of the release and lock positions after said pawl moves past a predetermined position defined by a line interconnecting the pivot location of said frame towards a respective one of the release and lock positions;
    belt acceleration responsive means associated with said spool and said pawl for moving said pawl from the release position towards the lock position and past said predetermined position in response to rotation of said spool in the belt withdrawal direction at a rate of acceleration above a predetermined rate to enable said spring to move said pawl to the lock position, said spring maintaining said pawl in the lock position after said pawl is moved to its lock position; and
    release means for moving said pawl from the lock position towards the release position and past said predetermined position in response to rewinding a predetermined amount of said seat belt webbing onto said spool to enable said spring to move said pawl to the release position, said release means comprising an arm for engaging said seat belt webbing rewound onto said spool and connected with said pawl to move said pawl towards the release position.

2. The seat belt retractor set forth in claim 1 wherein said inertia mechanism includes a planetary gear system having a planet gear movable about the axis, and connecting means for connecting said planet gear with said pawl for moving said pawl from the release position towards the lock position in response to said planet gear moving about the axis, said inertia mechanism acting on said planetary gear system to cause said planet gear to move about the axis when the rate of acceleration of said spool exceeds the predetermined rate.

* * * * *